US012244057B2

(12) United States Patent
Imagawa et al.

(10) Patent No.: US 12,244,057 B2
(45) Date of Patent: Mar. 4, 2025

(54) ANTENNA DEVICE

(71) Applicant: NEC Platforms, Ltd., Kawasaki (JP)

(72) Inventors: Takayuki Imagawa, Kanagawa (JP); Masato Tsuchiya, Kanagawa (JP); Shinya Yamamoto, Osaka (JP); Jou Hashime, Osaka (JP); Tomoyuki Kuge, Osaka (JP)

(73) Assignee: NEC Platforms, Ltd., Kawasaki (JP)

( * ) Notice: Subject to any disclaimer, the term of this patent is extended or adjusted under 35 U.S.C. 154(b) by 75 days.

(21) Appl. No.: 17/793,758

(22) PCT Filed: Dec. 25, 2020

(86) PCT No.: PCT/JP2020/048808
§ 371 (c)(1),
(2) Date: Jul. 19, 2022

(87) PCT Pub. No.: WO2021/149456
PCT Pub. Date: Jul. 29, 2021

(65) Prior Publication Data

US 2023/0089202 A1 Mar. 23, 2023

(30) Foreign Application Priority Data

Jan. 21, 2020 (JP) ................................ 2020-007197

(51) Int. Cl.
*H01Q 1/27* (2006.01)
*H01Q 1/12* (2006.01)

(52) U.S. Cl.
CPC ................ *H01Q 1/27* (2013.01); *H01Q 1/12* (2013.01)

(58) Field of Classification Search
None
See application file for complete search history.

(56) References Cited

U.S. PATENT DOCUMENTS 10,793,093 B2 * 10/2020 Callewaert ............ H01Q 1/422
2002/0133293 A1 * 9/2002 Goldman ............... G01S 19/36 342/357.31

(Continued)

FOREIGN PATENT DOCUMENTS

EP 1 796 206 A1 6/2007
JP 2000-031726 A 1/2000

(Continued)

OTHER PUBLICATIONS

International Search Report for PCT/JP2020/048808, dated Mar. 30, 2021.

(Continued)

*Primary Examiner* — Dameon E Levi
*Assistant Examiner* — Anh N Ho
(74) *Attorney, Agent, or Firm* — Sughrue Mion, PLLC

(57) ABSTRACT

Provided is an antenna device whose characteristics are enhanced (radio waves are efficiently emitted from an extended antenna) without need to place a communication unit that wirelessly communicates with the outside of a vehicle in close proximity to a loop structure of the vehicle, thus allowing a high flexibility of installation of the communication unit. An antenna device mounted on a vehicle includes a communication unit configured to wirelessly communicate with an outside of the vehicle, and a metal bracket configured to serve also as an extended antenna, and the communication unit includes a housing and a substrate-accommodated in the housing and on which a pattern antenna is formed, the metal bracket includes a first part fixed to the housing and a second part fixed to the vehicle.

4 Claims, 4 Drawing Sheets

(56) References Cited

U.S. PATENT DOCUMENTS

| | | | | |
|---|---|---|---|---|
| 2010/0019978 | A1* | 1/2010 | Okada | H01Q 19/062 343/702 |
| 2012/0229361 | A1* | 9/2012 | Goins | H01Q 9/28 343/893 |
| 2015/0171508 | A1 | 6/2015 | Jeon et al. | |
| 2016/0174407 | A1* | 6/2016 | Inaba | H05K 5/0204 361/752 |
| 2022/0026522 | A1* | 1/2022 | Sakurai | G01S 7/03 |

FOREIGN PATENT DOCUMENTS

| | | | | | |
|---|---|---|---|---|---|
| JP | 2001060814 | A | * | 3/2001 | |
| JP | 2001143114 | A | * | 5/2001 | H01Q 1/3216 |
| JP | 2003-249812 | A | | 9/2003 | |
| JP | 2015-154327 | A | | 8/2015 | |
| JP | 2016-111304 | A | | 6/2016 | |

OTHER PUBLICATIONS

Communication dated Jan. 31, 2023 from the Indian Patent Office in Indian Patent Application No. 202217041629.

* cited by examiner

ANTENNA DEVICE

CROSS REFERENCE TO RELATED APPLICATIONS

This application is a National Stage of International Application No. PCT/JP2020/048808 filed Dec. 25, 2020, claiming priority based on Japanese Patent Application No. 2020-007197 filed Jan. 21, 2020, the disclosure of which is incorporated herein in its entirety by reference.

TECHNICAL FIELD

The present invention relates to an antenna device.

BACKGROUND ART

An antenna device in which a feed element (a feed element that serves also as an antenna element) mounted on a roof of a vehicle and a loop structure of the vehicle to which the roof of this vehicle is fixed are spatially coupled (contactless electromagnetic coupling) is disclosed in Patent Literature 1, for example.

CITATION LIST

Patent Literature

PTL1: Japanese Unexamined Patent Application Publication No. 2003-249812

SUMMARY OF INVENTION

Technical Problem

However, one problem of the antenna device disclosed in Patent Literature 1 is that, in the case of using a communication unit that wirelessly communicates with the outside of the vehicle instead of the roof of the vehicle on which the feed element is mounted, the communication unit needs to be placed in close proximity to the loop structure of the vehicle to achieve spatial coupling between the communication unit and the loop structure of the vehicle, which limits the flexibility of installation of the communication unit.

An object of the present invention is to provide an antenna device whose characteristics are enhanced (radio waves are efficiently emitted from an extended antenna) without need to place a communication unit that wirelessly communicates with the outside of a vehicle in close proximity to a loop structure of the vehicle, thus allowing a high flexibility of installation of the communication unit.

Solution to Problem

An antenna device according to the present invention is an antenna device mounted on a vehicle, including a communication unit configured to wirelessly communicate with an outside of the vehicle; and a metal bracket configured to serve also as an extended antenna, wherein the communication unit includes a housing and a substrate accommodated in the housing and on which a pattern antenna is formed, the metal bracket includes a first part fixed to the housing and a second part fixed to the vehicle, and the first part and the pattern antenna are opposite to each other with part of the housing interposed therebetween so that the metal bracket and at least part of the pattern antenna are spatially coupled.

Advantageous Effects of Invention

According to the present invention, there is provided an antenna device whose characteristics are enhanced (radio waves are efficiently emitted from an extended antenna) without need to place a communication unit that wirelessly communicates with the outside of a vehicle in close proximity to a loop structure of the vehicle, thus allowing a high flexibility of installation of the communication unit

EXAMPLE EMBODIMENT

First Example Embodiment

An antenna device 1A according to a first example embodiment of the present invention will be described hereinafter with reference to the attached drawings. In the figures, the identical reference symbols denote identical structural elements and the redundant explanation thereof is omitted.

The structure of the antenna device 1A according to the first example embodiment is described hereinafter with reference to FIG. 1.

Figure 1:
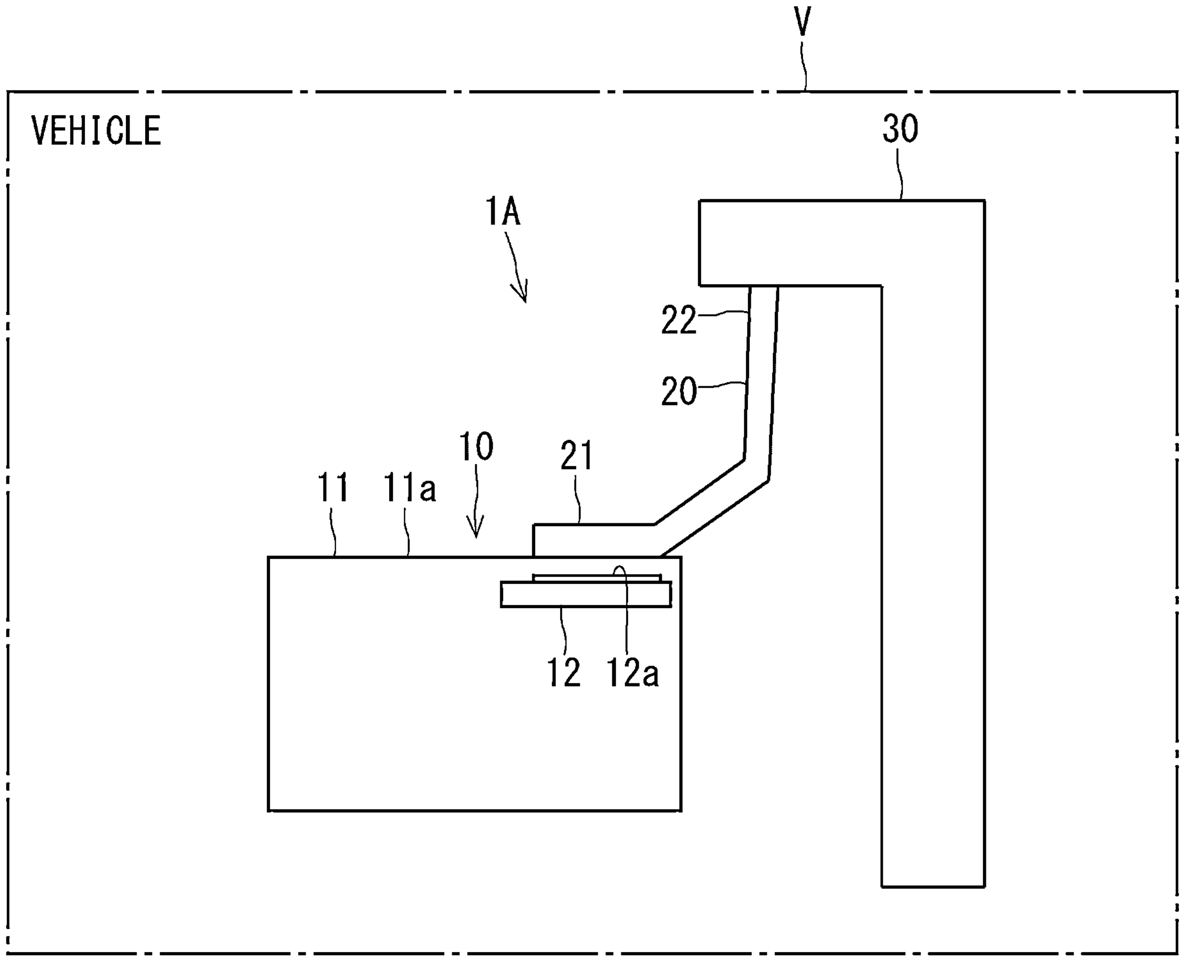
FIG. 1 is a schematic block diagram of an antenna device 1A according to a first example embodiment.

FIG. 1 is a schematic block diagram of the antenna device 1A according to the first example embodiment.

As shown in FIG. 1, the antenna device 1A according to the first example embodiment is an antenna device mounted on a vehicle V. The antenna device 1A includes a communication unit 10 (in-vehicle communication unit) that wirelessly communicates with the outside of the vehicle V, and a metal bracket 20 that serves also as an extended antenna.

The communication unit 10 includes a housing 11 and a substrate 12 accommodated in the housing 11 and on which a pattern antenna 12*a* is formed. The metal bracket 20 includes a first part 21 that is fixed to the housing 11 and a second part 22 that is fixed to the vehicle V (e.g., the inner surface of an instrument panel 30 or a vehicle frame (not shown)).

The first part 21 and the pattern antenna 12*a* are opposite to each other with part of the housing 11 (e.g., an upper part 11*a*) interposed therebetween so that the metal bracket 20 and at least part of the pattern antenna 12*a* are spatially coupled (contactless electromagnetic coupling).

As described above, according to the first example embodiment, there is provided the antenna device 1B whose characteristics are enhanced (radio waves are efficiently emitted from an extended antenna) without need to place the communication unit 10 that wirelessly communicates with the outside of the vehicle V in close proximity to the loop structure of the vehicle, thus allowing a high flexibility of installation of the communication unit 10.

This is achieved as follows. Since the first part 21 and the pattern antenna 12*a* are opposite to each other with part of the housing 11 (e.g., the upper part 11*a*) interposed therebetween so that the metal bracket 20 and at least part of the pattern antenna 12*a* are spatially coupled (contactless electromagnetic coupling), drive current of the pattern antenna 12*a* in the communication unit 10 causes induced current to occur in the metal bracket 20, which then causes radio waves (radio waves for communication) to be emitted from the metal bracket 20. In other words, this is achieved because the metal bracket 20 has a function as an extended antenna in addition to a function of fixing the communication unit 10 to the vehicle V.

Second Example Embodiment

An antenna device 1B according to a second example embodiment of the present invention will be described hereinafter with reference to the attached drawings. In the figures, the identical reference symbols denote identical structural elements and the redundant explanation thereof is omitted.

The structure of the antenna device 1B according to the second example embodiment is described hereinafter with reference to FIG. 2.

Figure 2:
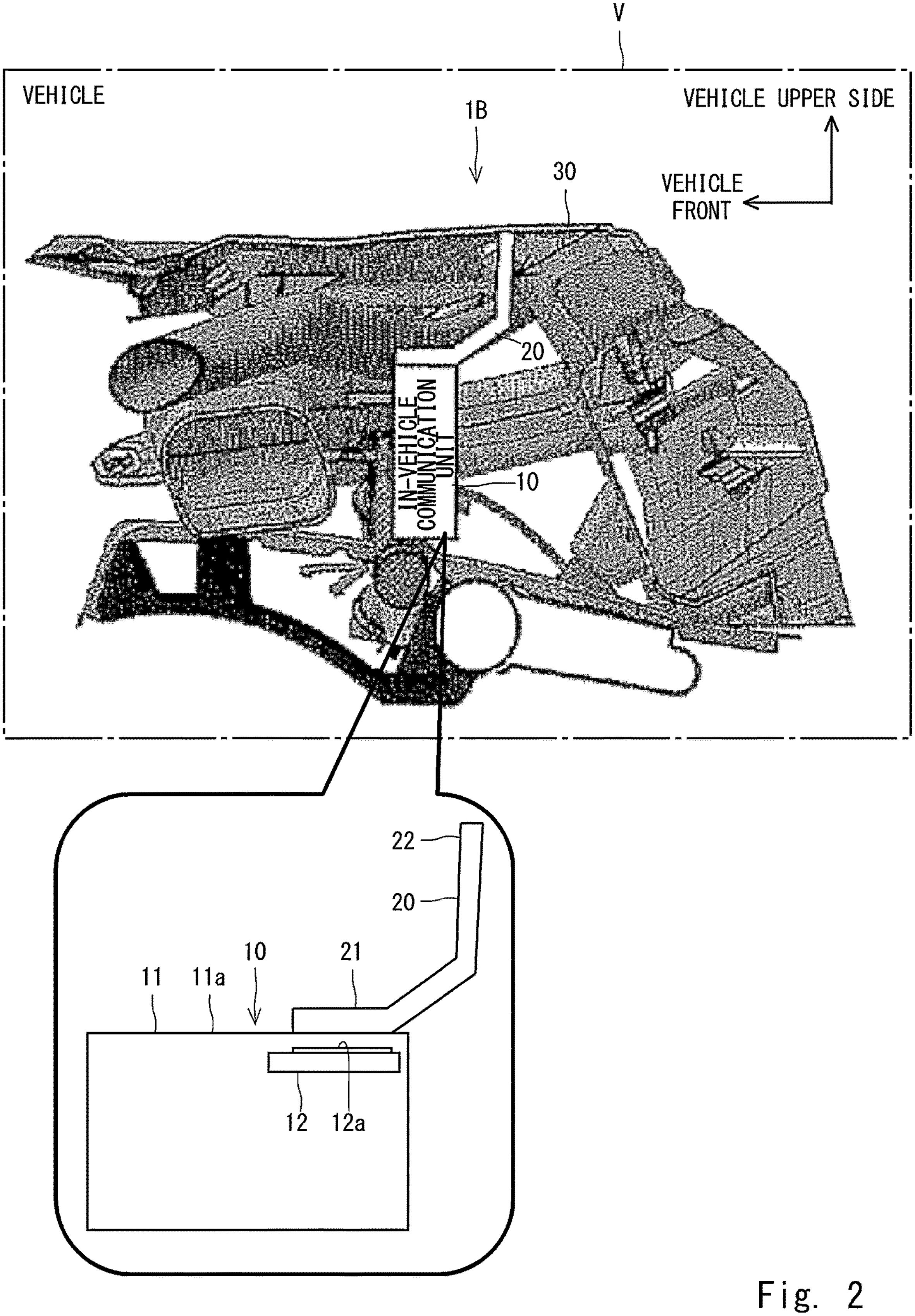
FIG. 2 is a schematic cross-sectional diagram of an antenna device 1B according to a second example embodiment.

FIG. 2 is a schematic cross-sectional diagram of the antenna device 1B according to the second example embodiment. FIG. 2 is a schematic cross-sectional diagram showing the cross section of the instrument panel 30 in the front-back direction of the vehicle when viewed from a side. The same elements as in the first example embodiment are denoted by the same reference symbols, and the explanation thereof is omitted as appropriate. Note that the position, the direction, and the angle of mounting the communication unit 10 are not limited to those shown in the figures.

As shown in FIG. 2, the antenna device 1B is mounted on a vehicle V. The antenna device 1B includes a communication unit 10 (which is also referred to as an in-vehicle communication unit) that wirelessly communicates with the outside of the vehicle V, a metal bracket 20 that fixes the communication unit 10 to the vehicle V and serves also as an extended antenna, and an instrument panel 30 on which measuring instruments (not shown) of the vehicle V and the like are placed. Each of the communication unit 10 and the metal bracket 20 is placed in the state where it is opposite to the inner surface of the instrument panel 30 (the back surface of the instrument panel 30 when viewing the instrument panel 30 from the vehicle interior side).

The communication unit 10 is a data communication module that wirelessly communicates with the outside of a vehicle, for example. The communication unit 10 includes a housing 11 and a substrate 12 (which is also referred to as a product substrate). The housing 11 is made of resin (synthetic resin). The substrate 12, a back-up battery (not shown) and the like are accommodated in the housing 11. A pattern antenna 12*a* is formed on the substrate 12. The pattern antenna 12*a* is a monopole antenna, an L antenna, an inverted-L antenna, an F antenna, or an inverted-F antenna, for example. The substrate 12 is placed inside the housing 11 in the state where the pattern antenna 12*a* is located in close proximity to an upper part 11*a* of the housing 11. Besides the pattern antenna 12*a*, an electronic component or the like that constitutes the communication unit 10 (i.e., that controls wireless communication) is mounted on the substrate 12; however, the illustration of the electronic component or the like is omitted in the figures.

The communication unit 10 is fixed to the vehicle V by the metal bracket 20.

The metal bracket 20 includes a first part 21 that is fixed to the housing 11 and a second part 22 that is fixed to the vehicle V.

The first part 21 is fixed to the upper part 11*a* (upper surface) of the housing 11, for example. A known fixing means (e.g., a screw) is used for this fixation. The first part 21 and the pattern antenna 12*a* are opposite to each other with part of the housing 11 (e.g., the upper part 11*a*) interposed therebetween so that the metal bracket 20 and at least part of the pattern antenna 12*a* are spatially coupled (contactless electromagnetic coupling). Specifically, the first part 21 is fixed at the position where it is not in contact with the pattern antenna 12*a* and where induced current occurs in the pattern antenna 12*a* due to drive current of the pattern antenna 12*a*.

The metal bracket 20 extends upward (e.g., toward the second part 22) from the first part 21. The second part 22 is fixed to a vehicle component located above the housing 11, such as the inner surface of the instrument panel 30 or a vehicle frame (not shown), for example.

An example of the operation of the antenna device 1B having the above-described structure is described hereinafter.

In the antenna device 1B having the above structure, since the first part 21 and the pattern antenna 12*a* are opposite to each other with part of the housing 11 (e.g., the upper part 11*a*) interposed therebetween so that the metal bracket 20 and at least part of the pattern antenna 12*a* are spatially coupled (contactless electromagnetic coupling), drive current of the pattern antenna 12*a* in the communication unit 10 causes induced current to occur in the metal bracket 20, which then causes radio waves (radio waves for communication) to be emitted from the metal bracket 20. In this manner, the metal bracket 20 has a function as an extended antenna in addition to a function of fixing the communication unit 10 to the vehicle V.

Figure 3A:
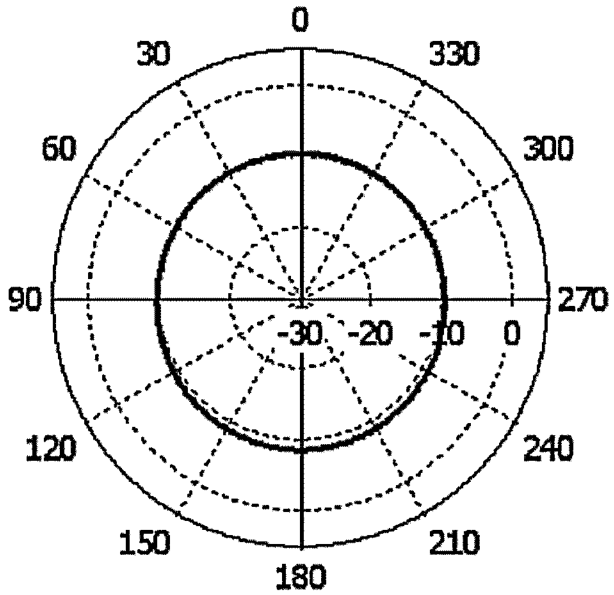
FIG. 3A is an example of calculating the emission pattern of radio field intensity in the case of not using a metal bracket 20 that serves also as an extended antenna.
Figure 3B:
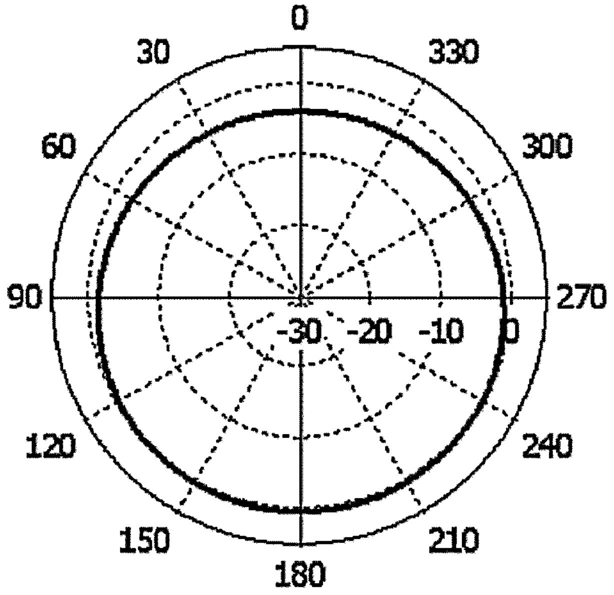
FIG. 3B is an example of calculating the emission pattern of radio field intensity in the case of using the metal bracket 20 that serves also as an extended antenna.

FIG. 3 is a comparative example of radio field intensity. FIG. 3A is an example of calculating the emission pattern of radio field intensity in the case of not using the metal bracket 20 that serves also as an extended antenna, and FIG. 3B is an example of calculating the emission pattern of radio field intensity in the case of using the metal bracket 20 that serves also as an extended antenna.

Referring to FIGS. 3A and 3B, the radio field intensity (characteristics) is enhanced by using the metal bracket 20 that serves also as an extended antenna as described in the second example embodiment.

As described above, according to the second example embodiment, there is provided the antenna device 1B whose characteristics are enhanced (radio waves are efficiently emitted from an extended antenna) without need to place the communication unit 10 that wirelessly communicates with the outside of the vehicle V in close proximity to the loop structure of the vehicle, thus allowing a high flexibility of installation of the communication unit 10.

This is achieved as follows. Since the first part 21 and the pattern antenna 12*a* are opposite to each other with part of the housing 11 (e.g., the upper part 11*a*) interposed therebetween so that the metal bracket 20 and at least part of the pattern antenna 12*a* are spatially coupled (contactless electromagnetic coupling), drive current of the pattern antenna 12*a* in the communication unit 10 causes induced current to occur in the metal bracket 20, which then causes radio waves (radio waves for communication) to be emitted from the metal bracket 20. In other words, this is achieved because the metal bracket 20 has a function as an extended antenna in addition to a function of fixing the communication unit 10 to the vehicle V.

Further, according to the second example embodiment, since the metal bracket 20 serves also as an extended antenna, the need for a contactless antenna that is integrally molded with the housing 11 is eliminated. This achieves weight and cost reduction of the housing 11.

Further, according to the second example embodiment, since the metal bracket 20 (extended antenna) is allowed to be installed away from the substrate 12 in the upper surface direction of the instrument panel 30, the receiving sensitivity can be improved.

Third Example Embodiment

An antenna device 1C according to a third example embodiment of the present invention will be described hereinafter with reference to the attached drawings. In the figures, the identical reference symbols denote identical structural elements and the redundant explanation thereof is omitted. Note that the position, the direction, and the angle of mounting the communication unit 10 are not limited to those shown in the figures.

Figure 4:
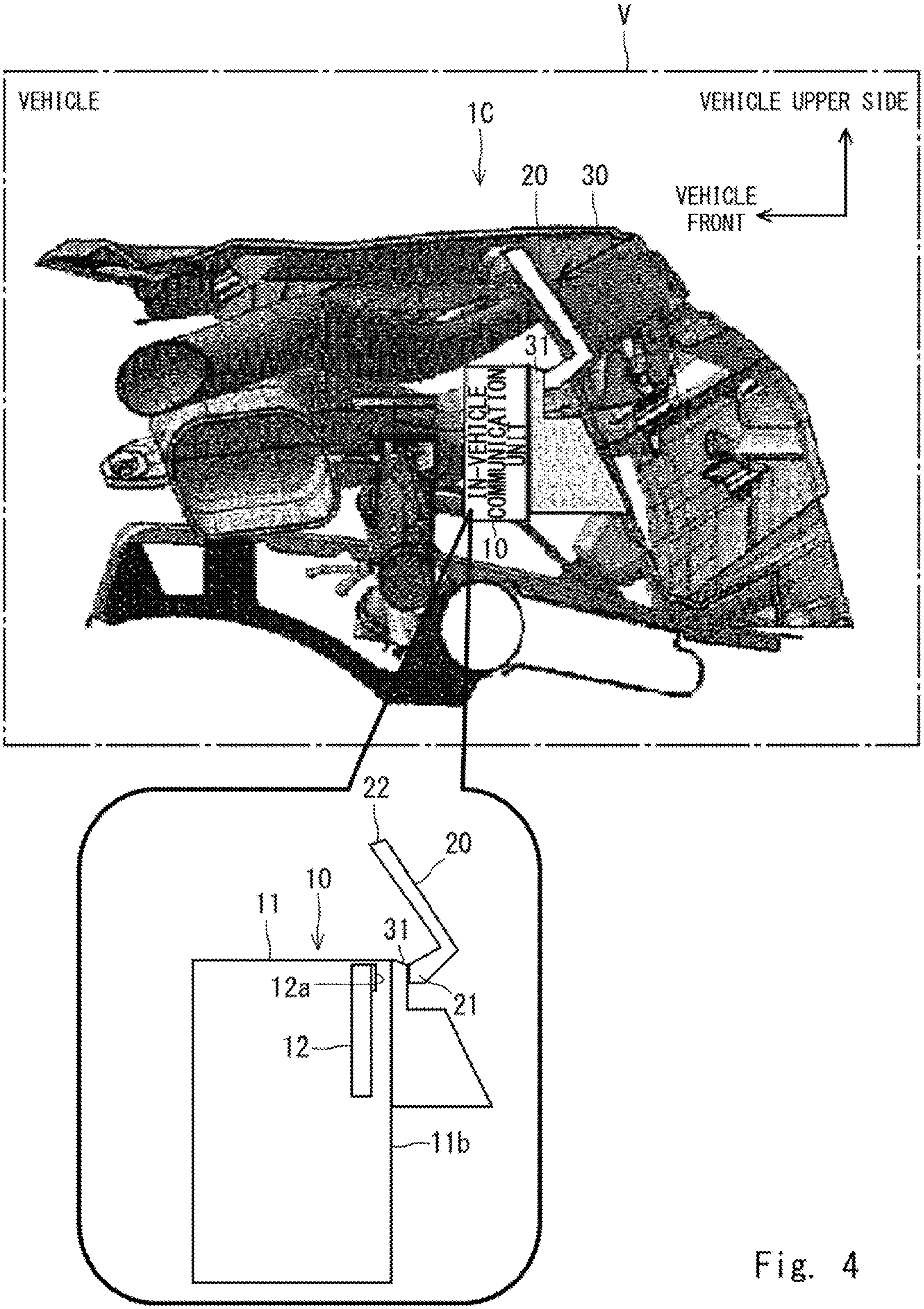
FIG. 4 is a schematic cross-sectional diagram of an antenna device 1C according to a third example embodiment.

FIG. 4 is a schematic cross-sectional diagram of the antenna device 1C according to the third example embodiment. FIG. 4 is a schematic cross-sectional diagram showing the cross section of the instrument panel 30 in the front-back direction of the vehicle when viewed from a side.

Differences from the second example embodiment are mainly described hereinbelow.

As shown in FIG. 4, a mold resin part 31 is placed between the first part 21 of the metal bracket 20 and the housing 11 of the communication unit 10. The mold resin part 31 is placed in this way in order to place the metal bracket 20 and the pattern antenna 12*a* with the positional relationship and shape that achieve spatial coupling (contactless electromagnetic coupling) (i.e., to achieve positioning between the metal bracket 20 and the pattern antenna 12*a*) by bringing each of the housing 11 of the communication unit 10 and the metal bracket 20 into contact with the mold resin part 31. To be specific, the first part 21 is fixed to a side part 11*b* (side surface) of the housing 11, for example, through the mold resin part 31. The mold resin part 31 is part of the instrument panel 30, for example. The first part 21 and the pattern antenna 12*a* are opposite to each other with part of the housing 11 (e.g., the side part 11*b*) and the mold resin part 31 interposed therebetween so that the metal bracket 20 and at least part of the pattern antenna 12*a* are spatially coupled through the mold resin part 31. The shape, size and the like of the mold resin part 31 are designed to achieve appropriate spatial coupling between the metal bracket 20 and the pattern antenna 12*a* in the state where part of the housing 11 (e.g., the side part 11*b*) and the mold resin part 31 are interposed therebetween (and in the state where each of the metal bracket 20 and the pattern antenna 12*a* is in contact with the mold resin part 31). Besides this point, the structure is the same as that of the antenna device 1C according to the second example embodiment.

As described above, the third example embodiment has the same effects as the second example embodiment.

Further, with the mold resin part 31, appropriate spatial coupling is achieved between the metal bracket (the extended antenna) and the communication unit 10 (the pattern antenna 12*a*) that are optimally designed for each vehicle (in a shape that efficiently emits radio waves). Installation work of the communication unit 10 and the metal bracket 20 is thereby improved when assembling the vehicle.

All of numerical values shown in the above-described example embodiments are by way of illustration only, and different appropriate numerical values may be used as a matter of course.

The above-described example embodiments are given by way of illustration only in all aspects. The present invention should not be interpreted in a limited manner by the description of the above example embodiments. The present invention can be implemented in various ways without departing from the spirit and the principal features of the present invention.

Although the present invention is described above with reference to the example embodiment, the present invention is not limited to the above-described example embodiment. Various changes and modifications as would be obvious to one skilled in the art may be made to the structure and the details of the present invention without departing from the scope of the invention.

REFERENCE SIGNS LIST

1A, 1B, 1C ANTENNA DEVICE
10 COMMUNICATION UNIT
11 HOUSING
11*a* UPPER PART
11*b* SIDE PART
12 SUBSTRATE
12*a* PATTERN ANTENNA
20 METAL BRACKET
21 FIRST PART
22 SECOND PART
30 INSTRUMENT PANEL
31 MOLD RESIN PART
V VEHICLE

The invention claimed is:

1. An antenna device mounted in a vehicle, the antenna device comprising:

a communication unit including a housing, the communication unit configured to wirelessly communicate with an outside of the vehicle;

a metal bracket configured to serve also as an extended antenna, the metal bracket includes a first part and a second part;

a mold resin part placed between the first part and the housing; and an instrument panel of the vehicle, wherein the communication unit further includes a substrate accommodated in the housing and on which a pattern antenna is formed, the first part is fixed to the housing and the second part is fixed to the instrument panel, and the first part and the pattern antenna are opposite to each other with part of the housing and the mold resin part interposed therebetween so that the metal bracket and at least part of the pattern antenna are spatially coupled through the mold resin part, and the mold resin part is part of the instrument panel.

2. The antenna device according to claim 1, wherein the metal bracket extends upward from the first part.

3. The antenna device according to claim 1, wherein each of the communication unit and the metal bracket is placed so as to be opposite to an inner surface of the instrument panel.

4. The antenna device according to claim 1, wherein the housing is made of resin.

* * * * *